United States Patent [19]

Hoksaas

[11] Patent Number: 4,880,982

[45] Date of Patent: Nov. 14, 1989

[54] FLUID INDICATOR FOR A CONTAINMENT VESSEL

[75] Inventor: Harald Hoksaas, Sauda, Norway

[73] Assignee: Impex Production & Development A/S (Ltd.), Sauda, Norway

[21] Appl. No.: 122,049

[22] Filed: Nov. 17, 1987

[51] Int. Cl.$^4$ ............................................. G01N 15/06
[52] U.S. Cl. ....................................... 250/577; 73/293
[58] Field of Search ................. 250/577; 73/293, 298, 73/327; 356/133, 134, 135; 340/619

[56] References Cited

U.S. PATENT DOCUMENTS

| | | | |
|---|---|---|---|
| 3,192,392 | 6/1965 | Reed | 250/577 |
| 3,535,934 | 10/1970 | Papata | 73/327 |
| 3,683,196 | 8/1972 | Obenhaus | 250/577 |
| 4,200,806 | 4/1980 | Walker et al. | 250/577 |
| 4,500,793 | 2/1985 | Kuramoto | 250/577 |
| 4,501,972 | 2/1985 | Foerster, Jr. et al. | 250/577 |

Primary Examiner—David C. Nelms
Assistant Examiner—Stephone B. Allen
Attorney, Agent, or Firm—Watts, Hoffmann, Fisher & Heinke

[57] ABSTRACT

A fluid indicator for use in a containment vessel. A sensor body is movable by a drive relative to the vessel. An indicator automatically indicates the location of the sensor body relative to the vessel. A passage is in the body through which fluid from the vessel can be viewed and a light emitter is positioned in the body so as to direct a beam through the fluid. A light sensor also positioned in the body receives light after it passes through the fluid and produces a signal in response thereto.

11 Claims, 2 Drawing Sheets

FLUID INDICATOR FOR A CONTAINMENT VESSEL

TECHNICAL FIELD

This invention relates to apparatus for detecting, identifying and controlling by signals, levels of different fluids, including mixtures of fluid-fluid, fluid-gas, fluid-solids and the like.

BACKGROUND ART

With the advancement of chemistry and its associated industries there is an increased need to control manufacturing processes for the filling and emptying of tanks and containers with multiple medias, such as fluids, gases and slurries of various materials. There is not only a requirement for volume determinations, but a requirement for re-identifying the material itself.

It has been a common practice in these industries to control processes manually, both as to volumes delivered and the rates of flow. This has proven to be not only expensive in cost, but also inefficient in the use of materials. This manual approach has been proven to be inadequate and unreliable as the skill and attention of the operators may vary considerably.

The need for an improved detection apparatus will be found in many applications where batch, or unit processing, of fluids is required, such as in the petrochemical industry. Other applications exist in commercial laundries, cosmetic laboratories, diesel engines, and diesel fuel distributing systems to name a few.

DISCLOSURE OF INVENTION

An object of my invention is to utilize the well known art of spectroscopy and spectrography and thereby selectively, reliably and economically repeat fluid measuring and combining processes without the use of highly skilled and trained operators.

Elaborate and highly refined instruments with wide latitude in recognition are available for laboratory and other applications where a very exact differentiation is required. My invention relates to a device that can sequentially measure and detect materials consistently and reliably in multiple ways without the use of expensive wide latitude spectroscopy instrumentation.

A primary application of my invention is in locations and processes in which the fluids are limited in number, and/or the fluid level determinations are to be recorded or determined. However, there are other potential applications being developed as relating to this invention, and this invention does not exclude such applications as may be found.

Broadly, the invention provides a fluid indicator for use in a containment vessel and comprises a sensor body movable by a drive relative to the vessel, an indicator that automatically indicates the location of the sensor body relative to the vessel, a passage in the body through which fluid from the vessel can be viewed, a light emitter positioned in the body so as to direct a beam through the fluid, and a light sensor positioned in the body to receive light after it passes through the fluid and to produce a signal in response thereto.

In a basic form the invention comprises a fluid detection and level indicator for use in a containment vessel and has a protective tube positioned and extending from the bottom to the top of the vessel. A second tube of transparent material is positioned within the first tube. A sensor body is slidably mounted and can be selectively positioned within the second tube. An indicator automatically indicates the position of the sensor body within the second tube. Fluid in the vessel is sensed through the transparent tube through the mechanism of a light emitter positioned in the body so as to direct a light beam through both the fluid and a prism, and a light sensor positioned in the body to receive light from the prism. The light emitter produces a signal in response to receiving light, whereby the presence of fluid at the level of the sensor is detected and indicated. The light beam will be refracted differently through different fluids and will exhibit different characteristics, and the detector, by virtue of its position and the character of the refracted beam, will thereby identify the particular fluid at the level of the sensor body.

In a preferred embodiment, the transparent tube is contoured to form a prism-shaped trough that receives the fluid to be sensed and through which the light beam is directed.

Further objects, features and advantages of the invention will become apparent from the following description and claims, and from the accompanying drawings.

BEST MODE FOR CARRYING OUT THE INVENTION

Figure 1:
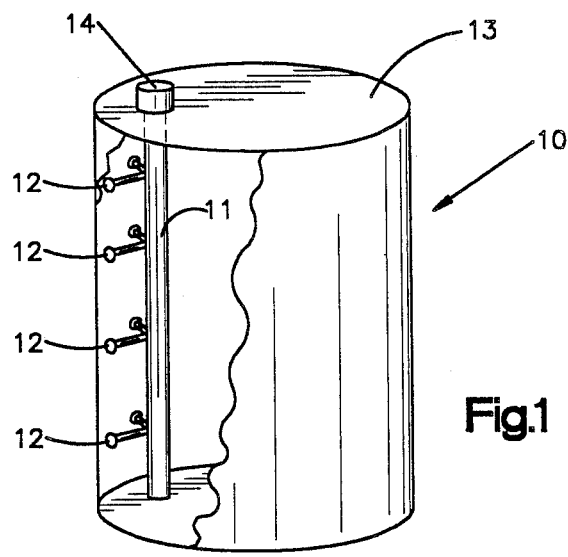
FIG. 1 is a perspective diagrammatic view of a vessel and the detector and indicator of the present invention.

FIG. 1 shows, for illustration purposes, a tank 10 for holding liquids. A perforated protective tube 11 circular in cross section is positioned vertically within the tank 10 by stays 12. The tube 11 extends from the bottom of tank 10 through a lid or top 13 of the tank and has connections 14 at the top for operating an indicator (not shown). A transparent tube 18 of glass or plastic is within and extends the length of the protective tube 11. A sensor body 20 of shorter axial length than the tubes is slidably received within the tube 18.

The transparent tube 18 is circular in cross section except for an inwardly extending V-shaped trough 22 extending the full length of the tube. A series of holes 24 in the protective tube are located adjacent the trough to allow fluid in the tank 10 to fill the trough to the level of the fluid in the tank. Two wall portions 22a, 22b form the trough and are angularly related to form, with the fluid in the trough, a prism suitable for diffracting a ray of light that passes through the walls and fluid at an appropriate angle.

The sensor body 20 has two vertical passages 26, 28 and a vertical v-shaped groove 29 that receives the trough 22. The passage 26 is threaded and receives a rotatable lead screw 30 that extends vertically the length of and within the transparent tube 18. An electric or hydraulic motor (not shown) drives the screw. The passage 28 is smooth and receives a stationary measuring rod 32 that extends vertically the length of and within the transparent tube 18. Two metallic strips 32a, 32b extend the length of and are embedded in the surface of the rod 32. The strip 32a is of low resistance and provides an electrical ground. The strip 32b is of uniform resistance per unit length and serves as a strip potentiometer. Two electrical contacts 34, 36 are in the body 20. The contact 34 rides against the strip 32a and the contact 36 rides against the strip 32b, to provide an indication of the electrical resistance between the body and the end of the rod element 32b at the bottom of the tank. The resistance is converted into a voltage output via a voltage divider circuit where one leg of the voltage divider is the element 32b. The voltage output is shown on an indicator, typically outside the tank, preferably calibrated to indicate the position of the sensor body in the tank.

Figure 3:
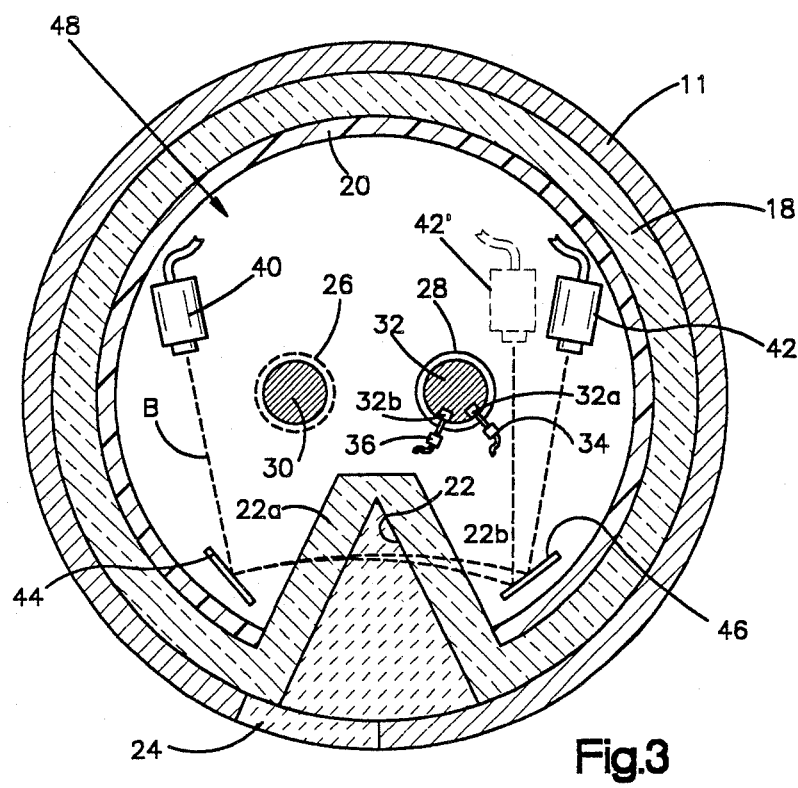
FIG. 3 is a sectional view taken along the line 3—3 of FIG. 2.
Figure 2:
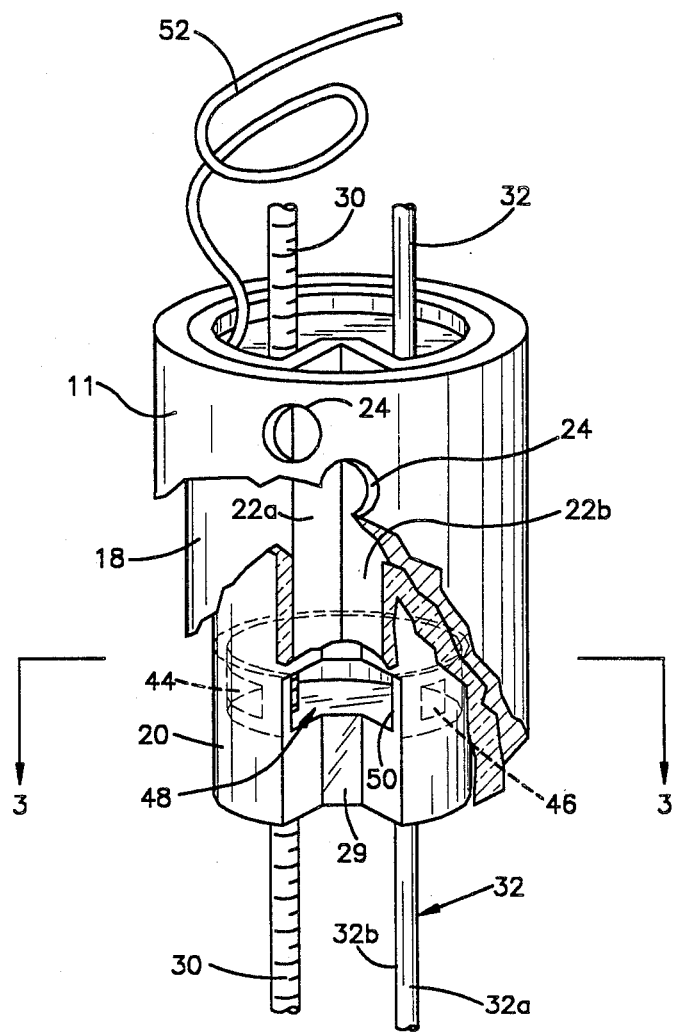
FIG. 2 is a perspective view with parts broken away of a protective tube, a transparent tube and a sensing unit, embodying the invention.

A light source 40 and a phototransistor sensor 42 are located within the sensor body 18 on opposite sides of the groove 29. The light source 40 is located to direct a light beam at an angle first through the wall portion 22a, then through the fluid in the trough 22 and then through the wall portion 22b. The sensor 42 is positioned to be able to receive the beam when an appropriate fluid fills the trough. Two mirrors 44, 46 direct the beam along the desired path to accommodate the space constraints imposed by the mechanical arrangement in the preferred embodiment. As illustrated in FIG. 3, the light source, sensor and mirrors are located in a chamber 48 through which the light beam diagrammatically indicated at B can pass. As also shown, the beam is directed through the prism formed by the walls 22a, 22b with the fluid at an appropriate angle so the beam is refracted as it passes through. The angle of refraction for any fluid to be sensed or measured is known and the sensor 42 is located to receive the beam only when it is refracted by that fluid. Where more than one fluid is to be sensed, as where a tank may contain two immiscible fluids, one floating on the other, one or more additional sensors, as illustrated in phantom at 42' in FIG. 3, can be provided and located to only receive the beam when refracted by the additional fluid or fluids. The sensor 42' is horizontally offset from the sensor 42. Physical constraints may necessitate additional light sources to accommodate any additional sensors, and may, for example, be displaced vertically rather than horizontally within the sensor body. The sensors emit an electrical signal when a beam is sensed and hence indicate the presence at the level of the sensor unit of a fluid having a preselected index of refraction and known characteristics of absorption. As shown in FIG. 2, the chamber 48 is shorter than the full height of the sensor unit and provides a "window" area 50 that moves along the trough 22 when the sensor unit is moved. The precise location in the window area at which the beam passes is known from the mechanical arrangement and the voltage meter is calibrated to indicate that location within the tank.

Electrical wires to the sensor unit contacts 34, 36, light source 40 and sensor 42 form a helical cable 52 coiled within the transparent tube 18 above the sensor unit and extend from the unit to the connections 14 at the top of the tube.

The apparatus can be operated in various modes. For example, the sensor unit can be moved by the drive screw to a desired position within a tank indicated by the measuring rod, and will sense and indicate when a fluid having a preselected index of refraction reaches that level. Alternatively, the sensor can be moved through fluids in a tank to detect levels of different immiscible fluids and, by virtue of the particular sensor that receives a refracted light beam, will identify the fluid. The signal or signals produced can be used to control valves, pumps or other associated equipment.

It should be understood that the term "light" as used herein includes radiation that is invisible as well as visible to the human eye and the term "transparent" means transparent to the radiation that comprises the light beam that is utilized with the apparatus.

While a preferred embodiment of the invention has been described, various modifications or alterations can be made therein without departing from the spirit and scope of the invention set forth in the appended claims. For example, the prism can be formed other than by the trough in the transparent tube, as by forming it in one wall or separately, but then without the structural savings and without the advantages of the large prism size afforded by the preferred construction. Also, while only one light beam sending means has been shown, multiple means may be included in one sensor body 20 having various wave length emitters to correspond with the liquids in the tank. With multiple means, it is possible to determine the level of fluid without moving the body up and down.

If the indicator described above is to be used in an explosive atmosphere the light emitter 40 and phototransistor sensor 42 may be located remote from the sensor unit and replaced within the unit by fiber optics and the measuring rod may be replaced by a gauge at the top of the lead screw 30 that measures rotation and is calibrated to indicate the resulting vertical location of the sensor unit, to eliminate all electrical currents inside tank 10.

I claim:

1. A fluid indicator for use in a containment vessel, comprising:
   a sensor body movable relative to the vessel;
   a drive connected to the body for moving it relative to the vessel;
   means for indicating the location of the body relative to the vessel;
   a passage in the body through which fluid from the vessel can be viewed;
   means including a light emitter in the body for directing a beam through said fluid, and
   means including a light sensor in the body for detecting the beam after it passes through the fluid and for producing a signal in response thereto.

2. A fluid indicator as set forth in claim 1 including a prism through which the beam passes before reaching said detecting means.

3. A fluid indicator for use in a containment vessel, comprising:
   a tube of transparent material for connection to a vessel containing fluid;
   a sensor body movable along the tube;
   a drive connected to the sensor body for moving it along the tube;
   means for indicating the location of the sensor body along the tube;
   a passage in the sensor body through which fluid adjacent the first tube can be viewed;
   means including a light emitter in the sensor body for directing a beam through said tube and fluid; and
   means in the sensor body for detecting said beam after it passes through said tube and fluid.

4. A fluid indicator as set forth in claim 3 including a prism located to intercept the beam that passes through said fluid.

5. A fluid indicator for use in a containment vessel, comprising:

a first tube for connection to a vessel, a port in the tube for communicating fluid from the vessel to the first tube;

a second tube of transparent material positioned within the first tube;

a sensor body movable within and along the second tube;

a drive connected to the sensor body for moving it along the second tube;

means for indicating the location of the sensor body along the second tube;

a passage in the sensor body through which fluid contained in the first tube can be viewed;

means including a light emitter in the sensor body for directing a beam through said second tube and fluid; and means in the sensor body for detecting said beam after it passes through said second tube and fluid.

6. A fluid indicator as set forth in claim 5 including a second means in the sensor body, displaced from said first-mentioned beam detecting means, for detecting said beam when the beam is directed through a different fluid from that through which when the beam passes it is detected by the first-mentioned beam detecting means.

7. A fluid indicator as set forth in claim 5 wherein the drive includes a rotatable lead screw and the sensor unit includes a nut portion and means restraining rotation, whereby the sensor unit is driven along the screw.

8. A fluid indicator as set forth in claim 5 wherein the means indicating the location of the sensor body includes a measuring rod within the second tube and along which the body moves, and means for sensing the position of the sensor unit along the rod.

9. A fluid indicator as set forth in claim 5 including a prism located to intercept the beam that passes through said fluid.

10. A fluid indicator as set forth in claim 9 wherein said prism is formed as a part of said second tube.

11. A fluid indicator as set forth in claim 10 wherein said second tube has a trough that extends into the passage in the sensor unit, that receives fluid contained in the first tube, and that has two walls angularly related to form with the received fluid a prism through which said beam is directed.

* * * * *